US008533680B2

(12) United States Patent
Tillmann et al.

(10) Patent No.: US 8,533,680 B2
(45) Date of Patent: Sep. 10, 2013

(54) APPROXIMATING FINITE DOMAINS IN SYMBOLIC STATE EXPLORATION

(75) Inventors: Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1339 days.

(21) Appl. No.: 11/322,966

(22) Filed: Dec. 30, 2005

(65) Prior Publication Data

US 2007/0157180 A1     Jul. 5, 2007

(51) Int. Cl.
G06F 9/44        (2006.01)
(52) U.S. Cl.
USPC ............................. 717/126; 717/104; 717/124
(58) Field of Classification Search
USPC .................................................. 717/124, 126
See application file for complete search history.

(56) References Cited

U.S. PATENT DOCUMENTS

| 5,557,773 | A * | 9/1996 | Wang et al. ........................... 1/1 |
| 6,484,134 | B1 * | 11/2002 | Hoskote ........................... 703/14 |
| 6,591,400 | B1 * | 7/2003 | Yang ................................. 716/2 |
| 6,738,955 | B2 * | 5/2004 | Andersen et al. ................. 716/4 |
| 2003/0088659 | A1 * | 5/2003 | Susarla et al. ................. 709/223 |
| 2003/0167182 | A1 * | 9/2003 | Bloom et al. ...................... 705/1 |
| 2003/0204834 | A1 * | 10/2003 | Ball et al. ...................... 717/106 |
| 2003/0225552 | A1 * | 12/2003 | Ganai et al. ....................... 703/2 |
| 2004/0153983 | A1 * | 8/2004 | McMillan ........................ 716/5 |

FOREIGN PATENT DOCUMENTS

EP         1515251 A1 *   3/2005

OTHER PUBLICATIONS

Clarke et al., "Automatic Verification of Finite-State Concurrent Systems," Apr. 1986, ACM, vol. 8 No. 2, pp. 244-263.*
Bultan et al., "Model-Checking Concurrent Systems with Unbounded Integer Variables," Jul. 1999, ACM, vol. 21 No. 4, pp. 747-789.*
Alur et al., "Alternating refinement relations," *Proceedings of the Ninth International Conference on Concurrency Theory (CONCUR '98)*, LNCS 1466:163-178, 1998.
Andrews et al., "Zing: Exploiting program structure for model checking concurrent software," *CONCUR 2004*, 2004.
Ball et al., "The SLAM project: Debugging system software via static analysis," *POPL 2002*, 2002.
Ball et al., "Zap: Automated theorem proving for software analysis," Technical Report MSR-TR-2005-137, Microsoft Research, 24 pages, Oct. 8, 2005.
Campbell et al., "Model-based testing of object-oriented reactive systems with Spec Explorer," *Technical Report MSR-TR-2005-59*, Microsoft Research, submitted, 2005.
Clarke et al., "Model Checking," *Handbook of Automated Reasoning*, MIT Press, Elsevier Science Publishers B.V., pp. 1367-1522, 2001.

(Continued)

*Primary Examiner* — Emerson Puente
*Assistant Examiner* — Jonathan R Labud
(74) *Attorney, Agent, or Firm* — Klarquist Sparkman, LLP

(57) ABSTRACT

A finite domain approximation for symbolic terms of a symbolic state is derived, given some finite domains for basic terms of the symbolic state. A method is executed recursively for symbolic sub-terms of a symbolic term, providing a domain over-approximation that can then be provided to a solver for determining a more accurate domain. The method can be applied to a wide array of system terms, including, for example, object states, arrays, and runtime types.

19 Claims, 5 Drawing Sheets

(56) References Cited

OTHER PUBLICATIONS

Detlefs et al., "Simplify: A theorem prover for program checking," <URL citeseer.ist.psu.edu/detlefs03simplify.html>, 2003.
Dwyer et al., "Building your own software model checker using the bogor extensible model checking framework," *Proceedings of the 17th Conference on Computer-Aided Verification (CAV 2005)*, to appear, 2005.
Dwyer et al., "Exploiting object escape and locking information in partial-order reduction for concurrent object-oriented programs," *Formal Methods in System Design*, 25, 2004.
Flanagan et al., "Dynamic partial-order reduction for model checking software," *POPL '05*, 2005.
Flanagan et al., "Transactions for software model checking," *Electronic Notes in Theoretical Computer Science* 89(3), 22 pages, 2003.
Godefroid "Software model checking: The VeriSoft approach," *Formal Methods in System Design*, 26, pp. 77-101, 2005.
Grieskamp et al., "Action machines—towards a framework for model composition, exploration and conformance testing based on symbolic computation," *Technical Report MSR-TR-2005-60*, Microsoft Research, 16 pages, May 2005.
Grieskamp et al., "XRT-Exploring Runtime for .NET—Architecture and Applications," *SoftMC 2005: Workshop on Software Model Checking*, Electronic Notes in Theoretical Computer, Jul. 2005.
Holzmann "The model checker SPIN," *IEEE Transactions on Software Engineering*, 23(5):1-17, May 1997.
Iosif "Symmetry reductions for model checking of concurrent dynamic software," *Software Tools for Technology Transfer (STTT)* 6:302-319, 2004.
Java PathFinder Home Page, <http://javapathfinder.sourceforge.net/>.
Khurshid et al., "Generalized symbolic execution for model checking and testing," *Proc. 9th International Conference on Tools and Algorithms for the Construction and Analysis of Systems*, pp. 553-568, 2003.
Marriot et al., "Programming with Constraints," *The MIT Press*, 1998.
Musuvathi et al., "An incremental heap canonicalization algorithm," *Technical Report MSR-TR-2005-37*, Microsoft Research, 15 pages, 2004.
Robby et al., "Bogor: An extensible and highly-modular model checking framework," *Proceedings of the Fourth Joint Meeting of the European Software Engineering Conference and ACM SIGSOFT Symposium on the Foundations of Software Engineering (ESEC/FSE 2003)*, 10 pages, 2003.
Robby et al., "Space-reduction strategies for model checking dynamic software," *Proc. SoftMC03 Workshop on Software Model Checking*, 19 pages, 2003.
Tillmann et al., "Parameterized unit tests," *Technical Report MSR-TR-2005-64*, Microsoft Research, to appear in FSE 2005, May 2005.

\* cited by examiner

```
                algorithm DeriveDomain
                  in t as TERM
                  out d as DOMAIN
137 ──────▶       in/out Domains as Map (TERM,DOMAIN)

121 ──────▶       if t in Domains
123 ──────▶         d := Domains[t]
                  else
125 ──────▶         match t
                      Var(_)        : ERROR // must be already in Domains
129 ──────▶           Value(v)      : d := Single(v)
                      Object(o)     : d := Single(o)
127 ──────▶           Binary(op,t1,t2) : d := ComputeBinaryDomain(op, DeriveDomain(t1),
                                                                  DeriveDomain(t2))
                      Initial(_)    : ERROR // is not a term representing program value
                      Update(_,_,_) : ERROR // is not a term representing program value
139 ──────▶           Select(t1,t2) : d := ComputeSelectDomain(t1, t2)
                    end match
                    Domains[t] := d
                  end if where
                    ComputeSelectDomain(Initial(t), _) =
                      DeriveDomain(t)
141 ──────▶         ComputeSelectDomain(Update(t1,_,t2), t3) =
                      Union(ComputeSelectDomain(t1, t3), DeriveDomain(t2))

131 ──────▶         ComputeBinaryDomain(plus, Range(v1, v2), Range(v3, v4)) =
                      Range(v1+v3, v2+v4))
133 ──────▶         ComputeBinaryDomain(...) =
                      // possible other rules, depending on operator and form of domains
                      ...
135 ──────▶         ComputeBinaryDomain(_, _, _) =
                      // if no other rule applies, fall back to full approximation
                      Range(Integer.Min, Integer.Max)
```

FIG. 1B

```
algorithm DeriveInitialVariableDomain
  in x as VARIABLE
  in S as STATE
  in/out Domains as Map (TERM,DOMAIN)
```

211 →   if x is number variable
213 →     Domains[Var(x)] := Range(Integer.Min,Integer.Max)
  else
215 →     Domains[Var(x)] := CollectAllObjects(S)

APPROXIMATING FINITE DOMAINS IN SYMBOLIC STATE EXPLORATION

FIELD

The technologies disclosed herein are directed toward software testing. More particularly, they are directed toward generating a set of possible values for one or more symbolic terms.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software testing is often a difficult aspect of software development. One tool for testing, model checking, can use state exploration for detecting bugs, such as data races, and for verifying that a model or implementation satisfies given temporal properties. State exploration can be particularly effective when a symbolic state representation is used, as this can allow multiple concrete state instances to be represented by one symbolic state.

Constraint solvers used in symbolic state exploration, such as "sat-solvers," can check whether a solution for a symbolic state exists, but cannot enumerate all possible solutions, as is often required. However, given a finite domain over-approximation of symbolic terms (which may themselves include several symbolic terms) used in a symbolic state, the problem of enumerating solutions can be reduced to a satisfiability problem, which is feasible for sat-solvers using finite domain constraint resolution techniques.

SUMMARY

A method is described for deriving a finite domain approximation for compound terms of a symbolic state, given some finite domains for basic terms of the symbolic state. Semantics of term operators are interpreted in the context of recursively obtained domain approximations of sub-terms. The method can employ various aspects of object-oriented programming systems (such as Microsoft® .NET connection software, from Microsoft Corp.), including object states, arrays, and runtime types.

In one example, a finite domain approximation for a symbolic term (which may include a symbolic sub-term) is determined by searching an assumption set for a domain approximation associated with the symbolic term and, if an associated domain approximation is not found in the assumption set, deriving a domain approximation for the symbolic term according to properties of the symbolic term. A domain for the symbolic sub-term may also be derived according to properties of the sub-term. In another example, an initial domain is assigned to the symbolic term. If the term is a number variable, this initial domain can be a range derived from the variable's number type, whereas, if the term is an object associated with the state, the initial domain is assigned after walking over field maps associated with the state, collecting the living objects of the state. Additional constraints are applied to the domain approximation, and the domain approximation is supplied to a constraint solver.

In another example, a computer-readable storage medium contains instructions which cause a computer to pass a symbolic parameter (comprising a symbolic sub-parameter) to a function in a symbolic state representation of a program. The parameter is simplified, and a domain of possible solutions is generated for the symbolic parameter. Symbolic execution of the function may be performed by constraint solvers using solutions of the domain to generate a set of actual solutions.

In a further example, a system for testing programs contains a digital processor and a computer memory. The memory may have elements such as a symbolic term (comprising one or more symbolic sub-terms), a domain derivation unit for determining an approximate set of values for the symbolic term, a test program, a simplifier for simplifying terms, and a solver. In this example, determining a set of values can include assigning an initial set of values to the symbolic term and examining an assumption set for a set of values associated with the symbolic term. If an associated set of values is not found in the assumption set, a possible set of values of the symbolic term is derived according to properties of the symbolic term. The test program can use the solver to determine an actual set of values for the symbolic term based on the approximate set of values. The test program can be configured to branch to one or more states in an implementation-under-test according to the actual set of values or the approximate set of values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 1B depicts sample pseudocode implementing one embodiment of a method of approximating a finite domain computation.

DETAILED DESCRIPTION

Figure 1A:
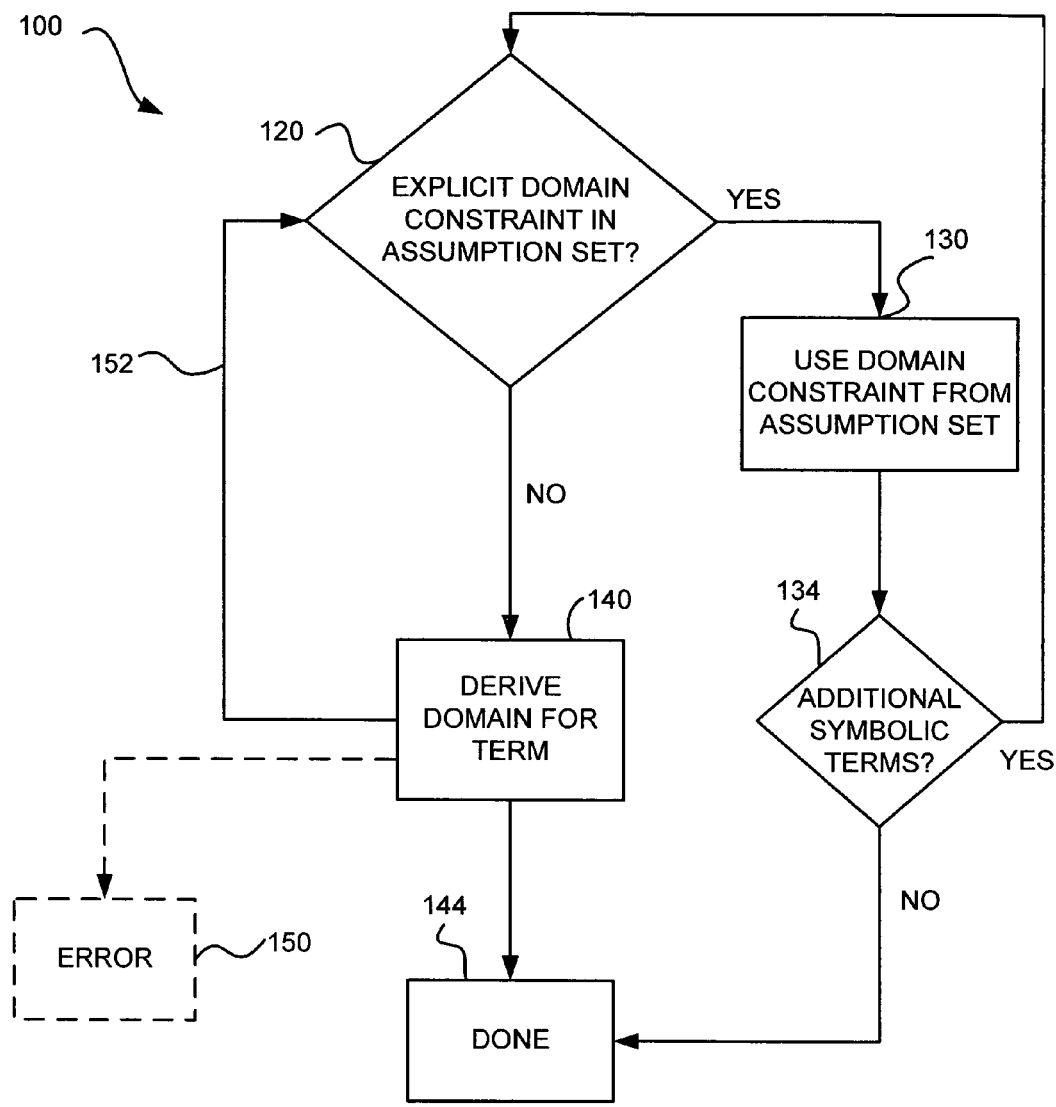
FIG. 1A depicts a flowchart for one embodiment of a method of approximating a finite domain computation.

Overview of Model Checking in Symbolic Domains

Software programs may be modeled as a set of states. A program may transition from a first state to a second state by, for example, invoking a method m which takes a number as a parameter. Sometimes, a program may be modeled using symbolic state representation, and m may be invoked using symbolic execution, in which case a symbolic parameter (such as x or x+1, where x is a logical variable) is passed to m.

See, e.g., U.S. patent application Ser. No. 11/197,912, filed Aug. 4, 2005, which is incorporated herein by reference. However, if m is a native method, it is not usually possible to execute m with a symbolic parameter (unless, for example, the source code for the method is available). One approach is to enumerate possible solutions to x+1, and then perform a symbolic execution for each solution. This requires generating a set of possible solutions.

Exemplary Framework

Although the methods described herein may be executed within a number of possible frameworks, in one embodiment the framework is Exploring Runtime (XRT), an exploration framework for programs represented in common intermediate language (CIL) of the .NET framework, available from Microsoft Corp. XRT's representation of state allows for arbitrary exploration strategies, but it may also be optimized for transactional exploration, where a transaction may comprise multiple instruction steps. XRT can support extensions, and one possible extension is a module for symbolic exploration. XRT executes on a virtual machine level. This section provides only an overview of one possible embodiment of the XRT framework.

XRT comprises three major subsystems which provide the program model, the state representation, and the execution environment, respectively.

Program Model

A program in XRT comprises assemblies, which may be loaded explicitly or as a side effect during program execution using standard .NET assembly loading rules. Elements of assemblies are loaded and instrumented lazily. The program model represents meta data using a type for different elements of an assembly (e.g., types, methods, fields, locals). Custom .NET attributes for assemblies, including an assembly itself, may be available.

The basic entity of executable code is a method body, which is represented as a control flow graph, wherein nodes are basic blocks of the graph. Basic blocks may end, for example, in a sequence of branch instructions pointing to other blocks, in a return instruction, or in an unwind instruction. Basic blocks may also have a special "exception exit" which points to the block being executed if an exception is raised. If an exception is not handled in a particular block context, the exception exit may point to a block which contains an unwind instruction. In one embodiment, instructions are represented by an abstraction of CIL, a language called XIL.

State Representation

A state representation in XRT can encode multiple aspects of a program's state, including static data, heap, and threads with call stacks. In one embodiment, XRT distinguishes two state representations: an "active" state is a mutable version of the state which allows full access, such as reading and writing; a "compressed" state (also called a "collapsed" state) is an immutable version which allows, for example, fast hashing and comparison. Active states can be obtained by uncompressing compressed states, and vice versa. In one embodiment, a compressed state can be realized as an internalized (hash-consed) vector of components.

Additionally, a state implementation can use a reference counting mechanism to detect dead objects in a compressed state. This is approximative because of the potential presence of cycles in object graphs. The reference count should be maintained at least during compression. When a hash-code is computed, or the heaps of a given object type of two compressed states are compared, reference count information can be used to skip dead entries. Global garbage collection on living compressed states can be used to prevent the global background (which may contain internalization tables) from growing indefinitely.

In a further embodiment, XRT is provided with a set of core extensions that provide some functions. Additionally, XRT can also operate with plug-in, symbolic state extensions which provide additional functionality. With one or more of these extensions, a symbolic state can live independently of an XRT core state, and the symbolic state may be used, for example, in contexts where no core state is available for a given operation. A symbolic state connector can wire a core state to a symbolic state using XRT's state extension API. Accordingly, values can be encoded to indicate whether the value's representation is in a core state or in an extension. Interpretations on extended values (which, for example, may be of value type or reference type) can be forwarded to the state extension. Like a core state, a state extension may have an active and a compressed representation, and a compression algorithm of the core state can call into the state extension. The compression algorithm can also be called back, as required.

Execution Environment

In one embodiment, the basic facility for executing code is the executor component. This component can provide a method which takes an active state and iterates instruction stepping of the active thread (including, e.g., calls and returns) until a suspension point is hit. A suspension can act like a choice point in a state exploration graph and can capture a compressed state and an enumeration of out-going transactions.

For example, one possible suspension type handles the grounding (i.e., the taking on of a concrete value) of symbolic parameters to native method calls. For this suspension type, the possible solutions to the symbolic parameters in the current symbolic state need to be enumerated. Each of the suspension's outgoing transactions represents one feasible parameter set for the native method call, computed by the domain approximation technique described herein.

Solvers and Assumption Sets

In one embodiment, a framework uses a solver for determining actual solutions from a domain of possible solutions. A domain is a set of possible values for a term (examples are given below). Further embodiments may use multiple "stacked" solvers, where one solver makes use of an underlying solver. For example, a framework could use a solver implementation which supports quick decision procedures on membership constraints (and thereby on equalities and unification, as well).

The solver's API can expose the construction of assumption sets. Assumption sets represent an abstract set of constraints, and they may have compressed and active forms. Operations on assumptions may include:

Term Simplification: Simplification (or reduction) takes a term and rewrites it to a simpler term, which may become ground this way. Some examples of term simplification are given later, for example in the section "Term Language."

Satisfiability Check: A satisfiability check determines whether a given assumption set has a solution.

Subsumption Check: A subsumption check determines if one assumption set is subsumed by another (i.e., the set of solutions of one is a subset of the set of solutions of the other).

Domain Query: A domain query determines the domain of a term associated with the assumption set. Some embodiments of methods for determining a domain are described below, for example, in the section "Finite Domain Approximation Method."

Assumption Split: Assumption sets can be split relative to a term, resulting in an enumeration of new assumption sets in which the given term has a more specialized domain. For example, if the domain d is a union, then the assumption sets resulting from a split will represent the left and right operands of the union, respectively. As a more specific example, if t is a Boolean term with domain t∈{0}∪{1} where 0 and 1 represent "false" and "true", respectively, splitting over t will produce two new assumption sets, one which contains t∈{0} and one which contains t∈{1}. For each of these cases, the solver now has complete knowledge and can, for example, simplify terms further based on the split assumption set.

Results of one or more of these operations may be inconclusive. The treatment of an inconclusive solver query can depend on the context. If over-approximation is desired, an inconclusive satisfiability query may be treated as successful. If under-approximation is desired, an inconclusive satisfiability query may be treated as a failure.

A solver implementation could support domains and splitting assumption sets, as well as satisfiability and subsumption checks. Two solvers that have been used for such implementations are Simplify and ZAP. If the underlying solver implementation does not support splitting (as is the case with Simplify and ZAP), but only satisfiability checks, the following technique can be used: Approximative domains of terms are computed, and domain assumption splitting can be performed using these domains. Assumption sets resulting from such an approximated split are checked for feasibility using satisfiability checks and disregarded if not feasible. If no solver is present, the domain approximation technique can be used together with a global search for naïve checking of satisfiability, though this is generally a technique of last resort.

Field Maps and Symbolic State

A field map is a representation of an object's state. It logically represents a mapping from an object's terms to field assignment terms for the object. The mapping can be syntactically given by a series of updates on an initial field map. The initial field map is denoted by the term Initial(t). In this field map, an object has the value t assigned to the field represented by the field map where t may represent the default value of the corresponding type of that field.

In one embodiment, a symbolic state comprises an assumption set, along with a mapping from fields and from array types to their current field and element maps. Generally, there may be one field map for each instance field, one element map for each value type, and one element map for all arrays with reference types as elements, in order to allow for covariance.

Term Language

Symbolic values can be represented by terms. In one embodiment, the terms are internalized (hash-consed). A variety of terms may be employed in representing symbolic values. By way of example, and not limitation, these terms could include: variables, objects, values (numbers), binary operations, and field maps.

In one embodiment, the following vocabulary is used to represent some terms:

Var(x) represents a logical variable x.

Object(id) represents a symbolic object with identity id. In the described embodiment, there is only one type of object; in other embodiments, objects may come with a runtime type.

Value(v) represents a ground value v.

Binary(op,t1,t2) represents a binary operation op applied to terms t1 and t2. Binary operators may include, for example, addition and multiplication.

Additionally, the following terms may be used to represent assignments to instance fields of objects in a given program state:

Initial(t) describes the initial (default) value of a field map; t is the value assigned to the field when no update has appeared on that field.

Update(t1,t2,t3) describes the update of a field map t1 on the object described by t2 with the value given by the term t3.

Select(t1,t2) describes the selection from the field map t1 for the object described by t2. If in a given program state S the value of field f is selected for object t2, then this selection is represented by the term Select(S(f),t2).

In a further embodiment, various reductions may be applied to the term language described above. Possible reductions include, but are not limited to:

Binary(PLUS, Value(v1), Value(v2))=Value(v1+v2). Similar reductions apply for other binary and unary operators. In general, when an operator is applied to ground values, the operator can be reduced (i.e., eliminated).

Update(Update(t1, Object(o1), t2), Object(o2), t3)=Update(Update(t1, Object(o2), t3), Object(o1),t2), if o1 is different from o2. This reduction can reorder updates on independent objects.

Update(Update(t1, Object(o), t2), Object(o), t3)=Update(t1,o,t3). According to this reduction, an update on an object kills an earlier update on the same object; together with the above rule for re-ordering updates, this may help minimize the history of update terms.

Select(Update(t1, Object(o), t2), Object(o))=t2. This reduction can reduce select operations on matching updates, and is supported by the above rule for re-ordering of updates.

Below is an example of how a symbolic state program may be represented using the term vocabulary outlined above. For purposes of this example, it is assumed that all program states are given by instance field assignments. Static fields and program variables are not considered explicitly. For each instance field in the program of this example, the state contains a mapping to the current field map which represents assignments to that field. Thus, if FIELD is the set of instance fields (which, by construction of the program, may be finite), a state S is a finite total function FIELD→TERM, where terms in the range of this mapping are either of the form Initial(_) or Update(_,_,_).

Example:

In an initial program state, S(f)=Initial(t) for all fields f. As the state of the program evolves, the function S(f) is updated accordingly. Thus, when the program performs an update in state S on field f of object t2 with value t3, then the successor state of that update will be S', such that S'(f)=Update(S(f), t2, t3) and S'(f')=S(f') for fields f' different from f.

The term language defined here represents one possible subset. Those skilled in the art will recognize that the described methods generalize to a richer set of terms, sufficient to represent symbolically the full data model of, for example, the .NET runtime or another environment. Another embodiment would include terms for representing the following: various kinds of numeric values; strings; runtime types; a complete set of binary and unary operations; record ("struct") data types; sub-typing relations; virtual method lookup; and array values. However, the described technology is not limited to any of the various symbolic representations known by those of ordinary skill in the art.

Domains

A domain is a set of terms that represents an over-approximation of the possible solutions to a term with variables. Constructors for domain terms could include, among others: the empty set, the singleton set, the range set, set union, set intersection, and projections on sets.

In the embodiment described below, some constructors for domains are represented as follows:

Single(t) represents the singleton set domain containing the term t.

Range(v1,v2) represents the numeric range from number v1 to number v2.

Union(d1,d2) represents the union of two domains.

Finite Domain Approximation Method

FIG. 1A depicts one embodiment of a method 100 of approximating a finite domain. The present embodiment derives domains for a given term t, which represents a program value, according to properties of the term. In accordance with the term language described above, these terms can include variables (Var), objects (Object), values (Value), binary operations (Binary), and selections (Select). In this example, the described embodiment does not take the following terms as input: domain terms (e.g., singleton, numeric range, and union); initial value (Initial) terms; or field map update (Update) terms, as these do not represent program values.

In one embodiment, initial assignments are made for the domains of logical variables. These assignments may, for example, be specified by the user at the time they are created. Alternatively, they may be derived automatically in the context of a given program state at the time the variable is created, provided that it is known that the variable represents a number variable or an object. A method for deriving initial domains is described below.

Additionally, reductions such as those outlined above may be applied to one or more terms.

In step 120, an assumption set is examined to determine if an explicit domain constraint has already been defined for a term. For example, a user annotation may have constrained a term to a range, e.g., 0≦x≦5. If so, that domain constraint is used to define the domain for that term (step 130). However, if the term does not have an explicit assumption about its domain, the domain can be derived (step 140).

Various embodiments may be designed to derive domains for various terms. In cases where a term contains one or more subterms, a domain can be derived for the term after domains for the one or more subterms are derived. The method 100 may thus operate recursively, as indicated by arrow 152 in FIG. 1A. Note that the described embodiment of method 100 does not depend on an actual state.

In one embodiment, if the method receives a term not representing a program value (e.g., an initial value term or a field map update term), an error condition may be returned (step 150). Optionally, a user is queried to determine how to handle the term (e.g., to modify the term or to continue without the term), though for embodiments which derive many domains per second, such a feature may be impractical.

Example domain computations for some term types are shown below:

Constant Value Terms (e.g., variables, objects, integers): The derived domain of a constant value is the singleton of the value.

Subtype Relation Terms (e.g., types and sub-typing operators): A domain for a subtype relation may be derived simply by saying that it can be false or true.

Binary and Unary Terms (e.g., binary and unary operators): For binary and unary terms, the derived domain is constructed according to the domain of the sub-terms and the semantics of the operator.

Runtime Type Terms (e.g., typing operators): For terms denoting runtime type, the derived domain can be computed by mapping the runtime type to the result of the domain computation of the embedded term.

Method Selection Operator: The domain of a method selection operator can be derived by mapping the operator to the elements of the domain of the sub-term.

Field Map Terms: The domain of a field map may be derived from an initial field map value and from subsequently assigned values.

FIG. 1B depicts a pseudocode function, "DeriveDomain," implementing one embodiment of method 100. The pseudocode checks for an explicit domain for the term (line 121) and, if none is found, proceeds to derive a domain based on features of the term (line 125 et seq.).

In this embodiment, domains for binary operators, for example, are derived by passing the operator to the function "ComputeBinaryDomain," along with recursive calls to DeriveDomain for the operands (line 127). ComputeBinaryDomain can derive the domain appropriately for a given binary operator according to a set of rules. Some possible examples of these rules appear at lines 131, 133, 135. Those of skill in the art will recognize other methods of deriving domains for other operators, based on the principles and methods disclosed herein.

If no rule exists for a given operator, DeriveDomain (or the functions called by it) may resort to a full approximation (e.g., approximate the domain as every possible value for that type of term), as shown at line 135.

Additionally, the pseudocode maintains as input and output a mapping ("Domains") from terms to domains, as shown at line 137. This mapping can serve as a cache for domain derivation, both for the function internally as well as for subsequent, external calls to the function.

The pseudocode of FIG. 1B also describes a function for deriving domains of field map selections, "ComputeSelectDomain" (line 139), which takes two arguments, t1 and t2. ComputeSelectDomain can be optimized by filtering out updates which do not apply to t2, although this optimization is not implemented in the pseudocode of FIG. 1B.

Functions called by DeriveDomain may employ reductions. For example, ComputeBinaryDomain(plus, Range(v1, v2), Range(v3, v4)) may reduce to Range(v1+v3, v2+v4)) (line 131). As another example, ComputeSelectDomain(Update(t1,_,t2), t3) may reduce to Union(ComputeSelectDomain(t1, t3), DeriveDomain(t2)) (line 141).

Example:

Given a term a+b, where a is a symbolic term representing an integer and b is a ground value of 5, a domain approximation can be obtained in accordance with the method 100 of FIG. 1A and the pseudocode function DeriveDomain of FIG. 1B.

In accordance with the method 100, an assumption set is examined for an explicit domain for a+b (see step 120 in FIG.

1A and line 121 in FIG. 1B). In this case, it is assumed that the assumption set contains no explicit domain for a+b. Accordingly, a domain is derived for the term (step 140). In the pseudocode of FIG. 1B, this is implemented in part by line 125, which determines the type of a term t. In this case, a+b is a binary operator term matching the expression Binary(op, t1, t2) of line 127, where "op" is the addition operator ("plus"), "t1" is a and "t2" is b. Accordingly, the command of line 127, ComputeBinaryDomain(op, DeriveDomain(t1), DeriveDomain(t2), is executed.

This command involves recursive calls to DeriveDomain to determine the domains of t1 and t2 (i.e., a and b). This recursive aspect is shown in part by arrow 152 in FIG. 1A leading back to step 120, where the assumption set is examined. In this case, it is assumed that the assumption set contains for a an explicit constraint of $0 \leq a \leq 10$. Accordingly, step 130 of FIG. 1A (corresponding to line 123 of FIG. 1B) assigns this explicit constraint to a. Although not true in this case, an explicit domain may itself contain a symbolic term (e.g., $0 \leq a \leq y$, where y is a symbolic term). Step 134 of FIG. 1A checks for additional symbolic terms in an explicit constraint and, if such terms are found in the constraint, returns to step 120 to determine a domain approximation for the addition symbolic terms. (This particular recursive aspect of method 100 is not implemented in the pseudocode of FIG. 1B.) If the explicit constraint contains no additional symbolic terms, that particular iteration of method 100 terminates (step 144).

Regarding the recursive call to DeriveDomain for b, it is assumed in this example that the assumption set contains no explicit domain for b. Thus, a domain is derived for b (step 140). In the pseudocode of FIG. 1B, at line 125 it is determined that b is a ground value matching the expression Value (v) of line 129. Accordingly, the command of line 129, Single (v) is executed, producing a domain of the singleton of b, i.e., the ground value 5. This particular iteration of method 100 then terminates (step 144).

Having determined the domains of a and b, these domains can be passed in the function call to ComputeBinaryDomain. Functions such as ComputeBinaryDomain can be defined to handle specific cases, as shown in lines 131, 133, 135, for example. It will be obvious to those of skill in the art how such function definitions may be composed. In this case, the domain of a+b is the sum of the domains of a and b, i.e., the integers 5 through 10, inclusive.

Figures 2A, 2B:
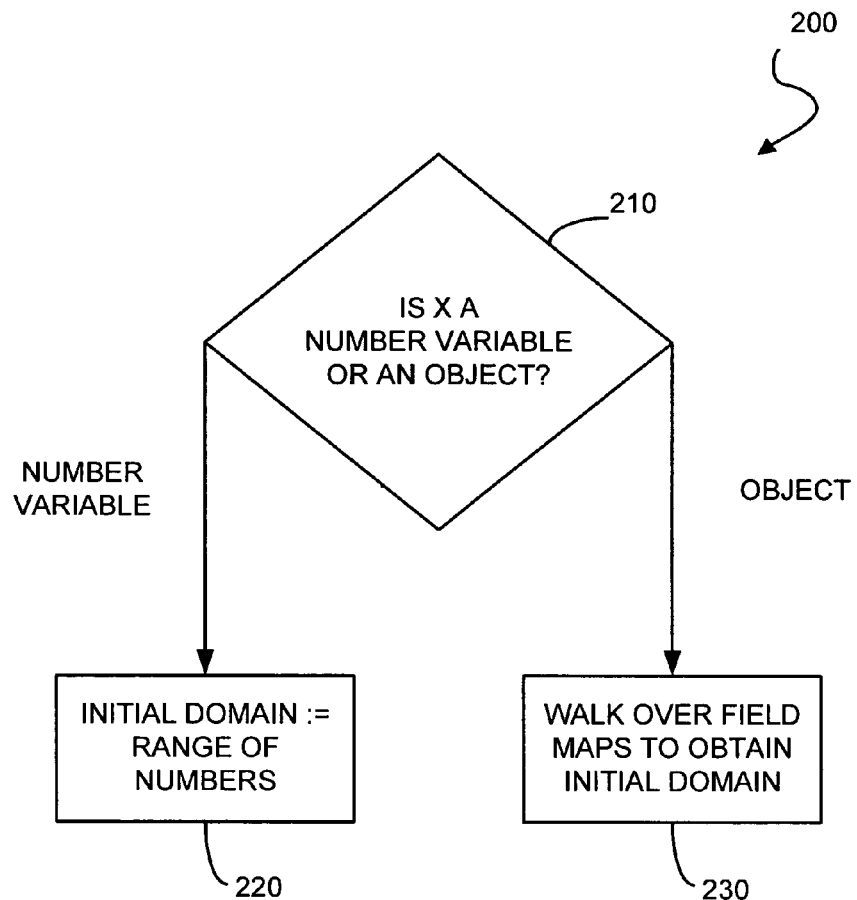
FIG. 2A depicts a flowchart for one embodiment of a method of deriving an initial variable domain.
FIG. 2B depicts sample pseudocode implementing one embodiment of a method of deriving an initial variable domain.

FIG. 2A depicts a flowchart for one embodiment of a method 200 of deriving an initial variable domain. The method checks whether a variable x is a number or an object (step 210). If x is a number, the domain is defined as the possible range of numbers for x (step 220). Those of skill in the art will recognize that this range can depend on factors such as constraints in a given programming environment.

If x is an object, the domain is defined by walking over the field maps of a given state and extracting object terms appearing in the state (step 230). This process may be optimized by not requiring a walk over the entire state, but by caching the active objects in each state. Additionally, if the objects are typed as in the full application, object collection can be restricted to objects which match the type of variable x.

FIG. 2B depicts sample pseudocode implementing one embodiment of a method of deriving initial variable domains. If the variable is identified as a number variable (line 211), the initial domain is defined as the full range of possible values for the number variable (line 213). If the variable is identified as an object, the function "CollectAllObjects" (line 215) can take a state as an argument, walk over field maps of the state, and return a domain containing Object terms appearing in the state.

Example:

Given a number variable x and an object z, an initial domain can be derived according to the method 200 in FIG. 2A and according to the pseudocode implementation of FIG. 2B. Step 210 determines whether x is a number variable or an object. This corresponds to line 211 in FIG. 2B. As x is a number variable, step 220 and line 213 define the initial domain as the full range of possible values for the number variable. For the object z, the function CollectAllObjects walks over field maps of the state, returning a domain containing object terms appearing in the state (step 230, line 215).

Exemplary System for Testing Programs

Figure 3:
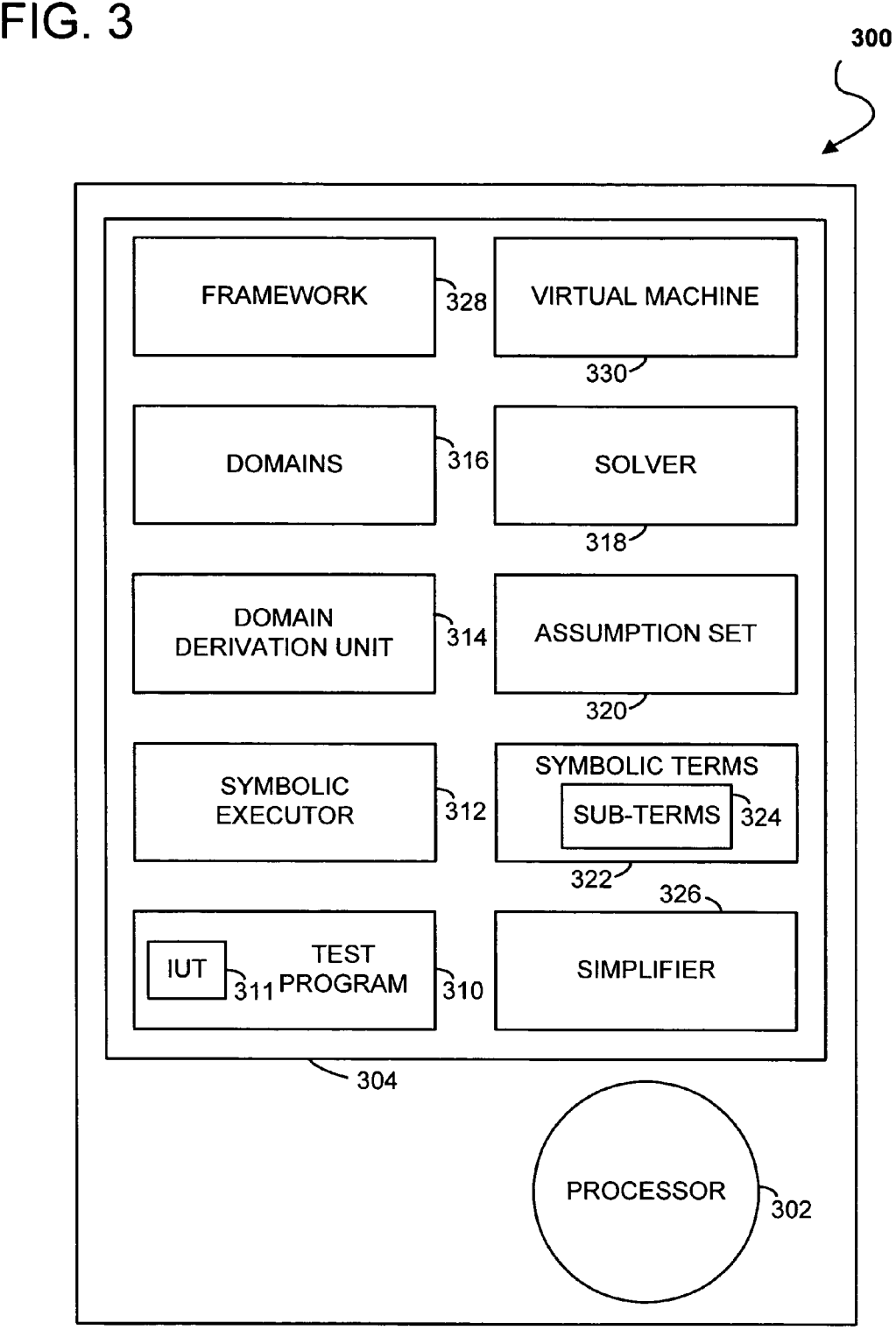
FIG. 3 depicts a block diagram of an exemplary system for testing programs.

FIG. 3 is an exemplary system for testing programs. The system 300 comprises a digital processor 302 and a digital memory 304. The digital memory 304 stores several computer-readable resources, such as: a test program 310, which may include an implementation under test (IUT) 311; a symbolic executor 312; a domain derivation unit 314; one or more sets of values known as domains 316, which may be actual or approximate domains; a solver 318; a set of values called an assumption set 320; one or more symbolic terms 322, which may comprise one or more symbolic sub-terms 324; and a simplifier 326. The computer-readable resources may execute within a virtual framework 328 and on one or more virtual machines 330.

In one example, the test program 310 models transitions in a program from a first state to a second state using one or more of the components in the exemplary system 300. The test program 310 encounters one or more symbolic terms 322 (and, possibly, one or more symbolic sub-terms 324) that are to be passed to a method or function. The symbolic terms 322 may be simplified by simplifier 326, possibly according to a set of pre-defined simplification rules. The assumption set 320 is examined for domains 316 of possible solutions for the symbolic terms 322. The assumption set 320 may be manipulated by the user, or values of the assumption set may be derived by the domain derivation unit 314. If necessary, approximate domains 316 can be derived by the domain derivation unit 314, which may recursively employ the finite domain approximation method described above. The solver 318 (which may work in conjunction with other solvers) may use an approximate domain and one or more sets of constraints to determine an actual domain. Furthermore, the test program 310 may use the domains 316 to branch to possible states in the IUT 311.

Exemplary Computing Environment

Figure 4:
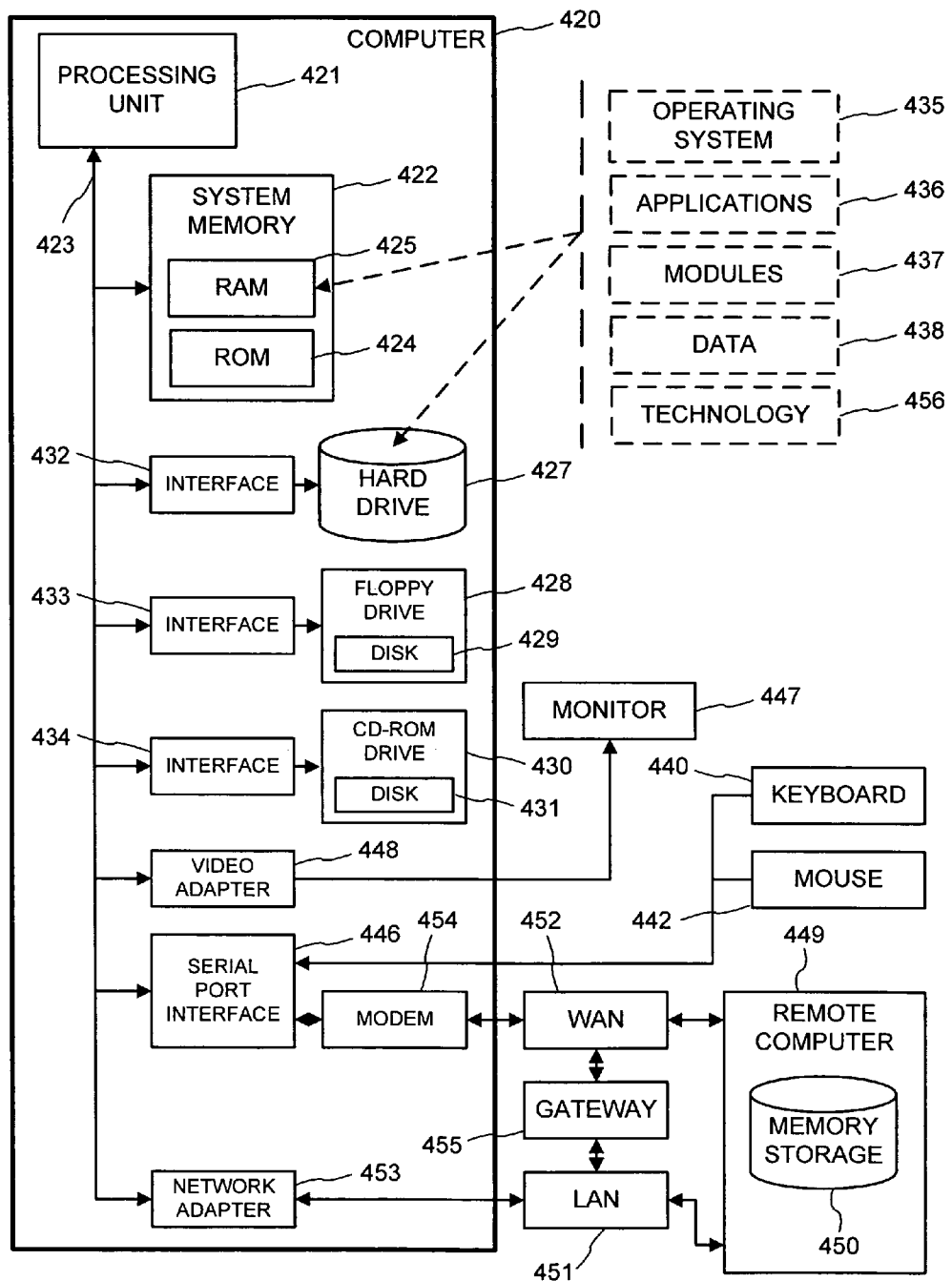
FIG. 4 depicts a block diagram of a distributed computer system for implementing methods described herein.

FIG. 4 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc., that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 4, an exemplary system for implementation includes a conventional computer 420 (such as personal computers, laptops, servers, mainframes, and other variety computers) includes a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc., for the computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438; in addition to an implementation of the described approximation of finite domains in symbolic state representation 456.

A user may enter commands and information into the computer 420 through a keyboard 440 and pointing device, such as a mouse 442. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 operates in a networked environment using logical connections to one or more remote computers, such as a remote computer 449. The remote computer 449 may be a server, a router, a peer device or other common network node, and typically includes many or all of the elements described relative to the computer 420, although only a memory storage device 450 has been illustrated. The logical connections depicted include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the computer 420 typically includes a modem 454 or other means for establishing communications (e.g., via the LAN 451 and a gateway or proxy server 455) over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of this technology with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of these features may be applied, it should be recognized that the details are illustrative only and should not be taken as limiting the scope of the claims. Rather, we claim as our invention all such embodiments as may come within the scope and spirit of the following claims and equivalents thereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method of determining a finite approximation of possible values for a symbolic term in a symbolic state representation of a program, the method comprising:

a computer examining a set of value constraints for a pre-defined approximation of possible values associated with the symbolic term, the symbolic term comprising a symbolic sub-term comprising a variable term;

as a result of not finding the pre-defined approximation of possible values in the set of value constraints, the computer determining a derived approximation of possible values for the symbolic term, the determining comprising:

determining properties of the symbolic term, the properties of the symbolic term comprising a term type;

assigning an initial domain to the symbolic sub-term comprising the variable term, the assigning the initial domain to the symbolic sub-term comprises walking over field maps of a representation of a given state and extracting one or more object terms appearing in the given state which match a type of the variable term; and selecting and applying one or more of a plurality of domain computation techniques according to the properties of the symbolic term comprising the term type; and the computer storing the derived approximation of possible values for the symbolic term in one or more computer-readable storage media.

2. The computer-implemented method of claim 1, wherein determining the derived approximation of possible values for the symbolic term comprises determining a derived approximation for the symbolic sub-term according to properties of the sub-term.

3. The computer-implemented method of claim 1, wherein the symbolic term is a number variable, and wherein assigning an initial domain comprises calculating a range of the number variable.

4. The computer-implemented method of claim 1, further comprising branching to one or more states of an implementation-under-test according to the derived approximation of possible values for the symbolic term.

5. The computer-implemented method of claim 1, wherein the method executes within a framework at a virtual machine level.

6. The computer-implemented method of claim 1, further comprising applying an additional set of constraints to the derived approximation of possible values for the symbolic term.

7. The computer-implemented method of claim 1, further comprising calculating an actual set of values for the symbolic term by supplying the derived approximation of possible values for the symbolic term to a constraint solver.

8. One or more nonvolatile computer-readable storage media containing instructions which, when executed by a computer, cause the computer to perform a method, the method comprising:

passing a symbolic parameter to a function of a program in a symbolic state representation of a program, the symbolic parameter comprising a symbolic sub-parameter that comprises a variable term;

examining a set of value constraints for a pre-defined approximation of possible values associated with the symbolic parameter;

as a result of not finding the pre-defined approximation of possible values in the set of value constraints, generating a domain of possible solutions for the symbolic parameter, the generating comprising:

determining properties of the symbolic parameter, the properties of the symbolic parameter comprising a term type;

determining possible values for the variable term, the determining the possible values for the variable term comprises walking over field maps of a representation of a given state and extracting one or more object terms appearing in the given state which match a type of the variable term; and selecting and applying one or more of a plurality of domain computation techniques according to the properties of the symbolic parameter comprising the term type; and performing the symbolic execution of the function using one or more solutions of the domain of possible solutions to generate a set of one or more actual solutions.

9. The one or more nonvolatile computer-readable storage media of claim 8, wherein the symbolic parameter further comprises an operator.

10. The one or more nonvolatile computer-readable storage media of claim 8, wherein the symbolic execution of the function using solutions of the domain is performed by a constraint solver.

11. The one or more nonvolatile computer-readable storage media of claim 10, wherein the constraint solver is a first constraint solver that works in conjunction with a second constraint solver.

12. The one or more nonvolatile computer-readable storage media of claim 8, wherein the method further comprises simplifying the symbolic parameter.

13. A system for testing programs comprising:
a digital processor; and
a digital memory storing a symbolic term comprising at least an object variable symbolic sub-term, the digital memory also storing instructions configured to cause the digital processor to determine an approximate set of values for the symbolic term, wherein determining the approximate set of values comprises, examining a set of value constraints for a pre-defined approximation of possible values associated with the symbolic term, and as a result of not finding the pre-defined approximation of possible values in the set of value constraints, determining a derived possible set of values of the symbolic term according to properties of the symbolic term by walking over field maps of a representation of a given state and extracting one or more object terms appearing in the given state which match a type of the object variable symbolic sub-term.

14. The system of claim 13, further comprising:
a test program; and
a solver, wherein the test program uses the solver to determine an actual set of values for the symbolic term based on the approximate set of values.

15. The system of claim 14, wherein the test program is configured to branch to one or more states in an implementation-under-test according to the actual set of values or the approximate set of values.

16. The system of claim 14, wherein the solver is a first solver working with a second solver.

17. The system of claim 13, wherein determining the approximate set of values further comprises simplifying the symbolic term with a simplifier.

18. The system of claim 13, wherein determining the approximate set of values further comprises assigning an initial set of values to the symbolic term.

19. One or more nonvolatile computer-readable storage media containing instructions which, when executed by a processor, cause the processor to perform a method, the method comprising:

assigning an initial domain to a variable term, the assigning the initial domain to the variable term comprises walking over field maps of a representation of a given state and extracting one or more object terms appearing in the given state which match a type of the variable term;

passing a symbolic parameter to a first function in a symbolic state representation of a program, the symbolic parameter comprising a first term and a second term, the first term comprising the variable term;

searching a set of value constraints for a pre-defined approximation of possible values associated with the first term and for a pre-defined approximation of possible values associated with the second term;

finding in the set of value constraints the pre-defined approximation of possible values associated with the first term, the pre-defined approximation of possible values associated with the first term comprising the possible values for the variable term;

as a result of not finding in the set of value constraints the pre-defined approximation of possible values associated with the second term, generating a set of possible values for the second term using a second function selected from a plurality of domain approximation functions according to a property of the second term, wherein the property comprises a term type, the first function being different from the second function;

wherein the generating the set of possible values for the second term comprises recursively passing a sub-term of the second term to the first function to generate a set of possible values for the sub-term of the second term of the symbolic parameter; and performing a symbolic execution of the first function using the pre-defined approximation of possible values associated with the first term and the generated set of possible values for the second term.

* * * * *